(12) United States Patent
O'Neill

(10) Patent No.: US 9,213,354 B2
(45) Date of Patent: Dec. 15, 2015

(54) PEDAL WITH ACTIVE RELEASE

(75) Inventor: Dan O'Neill, Chatham (CA)

(73) Assignee: KSR IP Holding LLC., Wilmington, DE (US)

( * ) Notice: Subject to any disclaimer, the term of this patent is extended or adjusted under 35 U.S.C. 154(b) by 0 days.

(21) Appl. No.: 13/884,288

(22) PCT Filed: Nov. 17, 2011

(86) PCT No.: PCT/IB2011/002733
§ 371 (c)(1),
(2), (4) Date: May 9, 2013

(87) PCT Pub. No.: WO2012/066412
PCT Pub. Date: May 24, 2012

(65) Prior Publication Data
US 2013/0220061 A1    Aug. 29, 2013

Related U.S. Application Data

(60) Provisional application No. 61/414,573, filed on Nov. 17, 2010.

(51) Int. Cl.
*B60K 26/02* (2006.01)
*G05G 1/323* (2008.04)
*B60K 23/02* (2006.01)
*B60R 21/09* (2006.01)
*B60T 7/06* (2006.01)
*G05G 1/32* (2008.04)

(52) U.S. Cl.
CPC ............... *G05G 1/323* (2013.01); *B60K 23/02* (2013.01); *B60K 26/02* (2013.01); *B60R 21/09* (2013.01); *B60T 7/065* (2013.01); *G05G 1/32* (2013.01); *Y10T 74/20528* (2015.01)

(58) Field of Classification Search
CPC ............ B60T 7/06; B60T 7/065; B60T 7/22; B60R 21/09; G05G 1/327
USPC ...................... 74/512, 513, 560; 180/274, 275
See application file for complete search history.

(56) References Cited

U.S. PATENT DOCUMENTS 5,983,746 A * 11/1999 Nawata et al. .................. 74/512
6,176,340 B1 * 1/2001 Mizuma et al. ................ 180/274
6,742,411 B2   6/2004 Aoki et al.
(Continued)

FOREIGN PATENT DOCUMENTS

DE           19616845 A1 * 11/1997 .............. B60T 7/06

OTHER PUBLICATIONS

International Search Report dated Mar. 6, 2012, International Application No. PCT/IB2011/002733 filed Nov. 17, 2011.

*Primary Examiner* — Thomas Diaz
(74) *Attorney, Agent, or Firm* — Dinsmore & Shohl LLP; Thomas E. Anderson

(57) ABSTRACT

An active release system for a pedal assembly which permits the pedal to be operated after releasing. A pivot pin supporting the pedal arm is mounted in a plurality of slots. The pin is held in position in the slots by a release lever assembly. The release lever assembly is held in position by two shear pins. The force of the discharge during a crash breaks the shear pins to rotate a release lever away from the pivot pin. The pedal pivot pin is then free to travel in the slots in the mounting bracket towards the occupant thereby pivoting the pedal arm from the passenger compartment allowing the pedal to be operated after releasing.

19 Claims, 4 Drawing Sheets

(56) References Cited

U.S. PATENT DOCUMENTS

| | | | |
|---|---|---|---|
| 7,415,909 B2* | 8/2008 | Miyoshi et al. | 74/560 |
| 2001/0006010 A1* | 7/2001 | Choi | 74/512 |
| 2005/0029794 A1 | 2/2005 | Riefe et al. | |
| 2005/0056115 A1 | 3/2005 | Da Silva et al. | |
| 2008/0006119 A1* | 1/2008 | Tokumo et al. | 74/560 |
| 2009/0250285 A1 | 10/2009 | Allen et al. | |
| 2010/0154581 A1 | 6/2010 | Sukonthapanich | |

* cited by examiner

PEDAL WITH ACTIVE RELEASE

CROSS-REFERENCE TO RELATED APPLICATIONS

This application is the U.S. national phase of PCT/IB2011/002733 filed Nov. 17, 2011, which claims priority of U.S. Provisional Patent Application No. 61/414,573 filed Nov. 17, 2010, the contents of which are incorporated herein by reference.

FIELD OF THE INVENTION

This invention relates generally to pedal systems for automotive vehicles. More particularly, this invention relates to pedal systems having releasing mechanisms in the event of a vehicle crash.

BACKGROUND OF THE INVENTION

It is known to provide vehicle pedal assemblies which move to keep pedals from being forced into the passenger area when there is a front end collision. One type of system uses a cross bar to release the pivot pin supporting the pedal arm. This permits the pedal arm to be easily rotated about an intermediate point on the pedal arm such as the arm attachment for a brake rod or a clutch master cylinder. However, prior assemblies do not permit activation of the pedal system after releasing and may result in parts being ejected into the passenger compartment.

SUMMARY OF THE INVENTION

The present invention provides for an active release system for a pedal assembly which permits the pedal to be operated after releasing. A pivot pin supporting the pedal arm is mounted in a plurality of slots. The pin is held in position in the slots by a release lever assembly. The release lever assembly is held in position by two shear pins. The force of the discharge during a crash breaks the shear pins to rotate a release lever away from the pivot pin. The pedal pivot pin is then free to travel in the slots in the mounting bracket towards the occupant thereby pivoting the pedal arm from the passenger compartment allowing the pedal to be operated after releasing.

DETAILED DESCRIPTION OF THE DRAWINGS

A pivot pin supporting the pedal arm is mounted in a plurality of slots. The pin is held in position in the slots by a release lever assembly. The release lever assembly is held in position by two shear pins. The force of the discharge during a crash breaks the shear pins to rotate a release lever away from the pivot pin. The pedal pivot pin is then free to travel in the slots in the mounting bracket towards the occupant thereby pivoting the pedal arm from the passenger compartment allowing the pedal to be operated after releasing.

Figure 1:
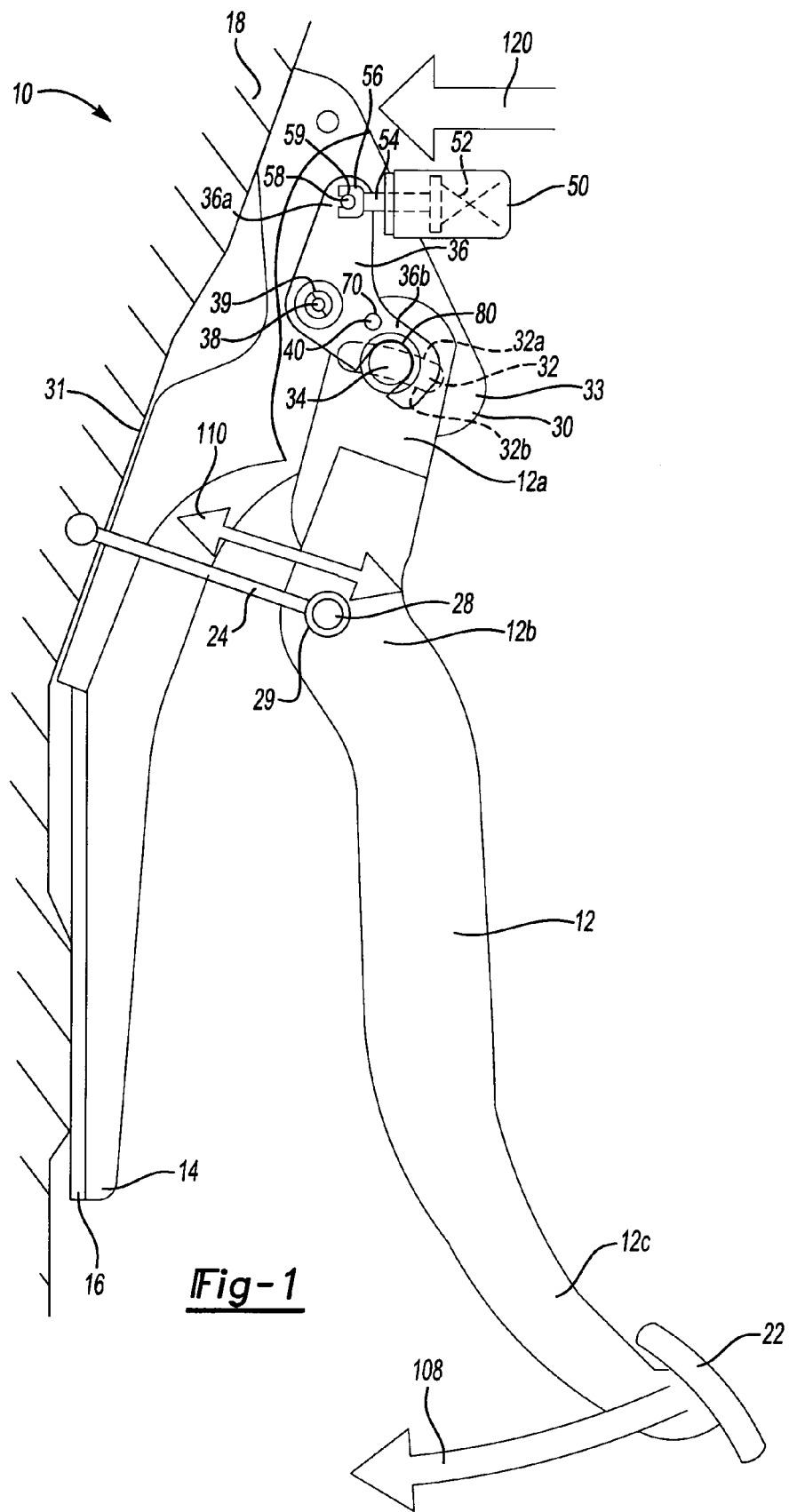
FIG. 1 is a side view of the pedal assembly having active release.

As shown in FIG. 1, the pedal assembly 10 includes a mounting bracket 30 which supports the pedal arm 12. The pedal arm 12 includes an upper portion 12a, a middle portion 12b, and a lower portion 12c. The upper portion 12a connects to the mounting bracket 30. The middle portion 12b connects to a pushrod 24. The pedal arm 12 connects the upper portion 12a to the middle portion 12c at connection 26. After the pedal 12 is released, the pedal arm 12 pivots about the connection 28 connecting the pushrod 24 to the pedal arm 12. The lower portion 12c of the arm 12 includes a footrest 22 for depressing the pedal 12 to activate the pedal assembly. As shown by the movement arrow 108, the user presses the footrest 22 of the pedal 12 to activate the pedal assembly.

Figure 2:
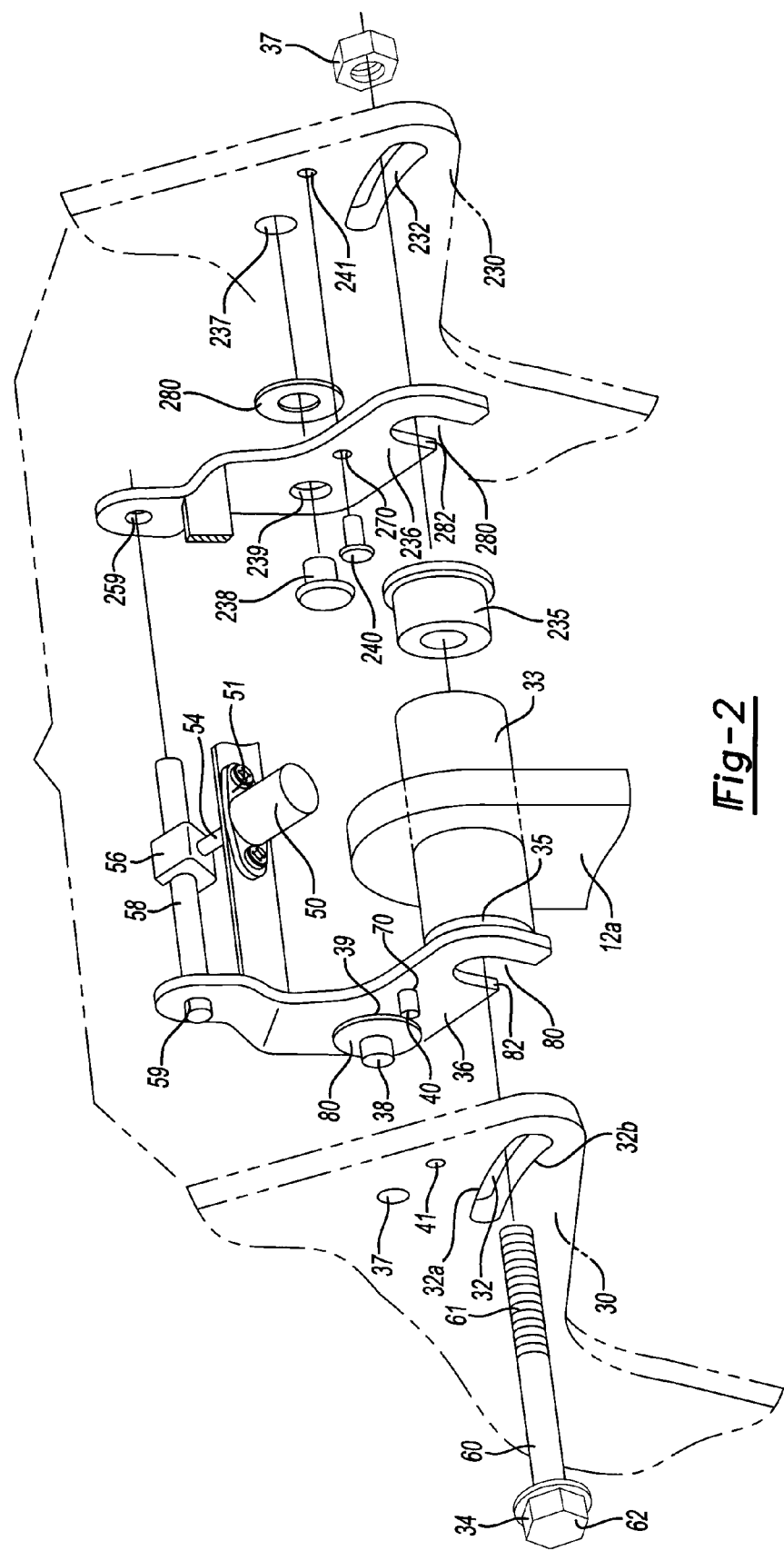
FIG. 2 is an exploded perspective view of the active release portion of the pedal assembly.

The mounting bracket 30 has a lower portion 31 which is a flat planar portion mounted to the vehicle firewall 18. The mounting bracket 30 has an upper portion 33 which is essentially a pair of curved walls which extend rearwardly to the passenger compartment from the mounting bracket 30. Each of these curved walls or arms 33 includes a slot 32 for receiving the pivot pin 34. In the present embodiment, the slot extends downwardly and rearwardly from the normal pivot pin 34 position. Other geometries and configurations are also used and known. The pivot pin 34 is held in position in the slot 32 by a release assembly. The slot 32 includes generally parallel inner walls 32a, 32b. The walls 32a, 32b are spaced apart and generally perpendicular as compared to one another. The assembly 10 includes a pair of release levers 36, 236 and a connection element 60. Each lever 36, 236 is pivotally connected to the inner side of the bracket walls 30, 230 of a first axis. Each of the levers 36, 236 is connected at a second axis by the connection element. Each of the levers 36, 236 has an open ended slot or cutout 80, 280. The cutouts 80, 280 include an inner wall 82, 282. The cutouts 80, 280 are adapted to fit around the connection member 60. In the present embodiment, the pivot pin or connection member 34, 60 is a bolt 62 having a threaded portion 61 and a head portion 62. The bolt is secured on an opposite end by a nut 37, as shown in FIG. 2.

Each delatching lever 36, 236 is held in place by a shear pin 40, 240. The shear pin 40, 240 extends through each release lever 36, 236 and further through the wall of the mounting brackets 30, 230. The shear pins 40, 240 extend through the levers 36, 236 by means of the apertures 70, 270. The shear pins 40, 240 extend through the mounting brackets 30, 230 by means of the apertures 41, 241.

The levers 36, 236 are further supported by a pivot pin 38, 238. The pivot pins 38, 238 extend through the mounting brackets 30, 230 and also through the levers 36, 236. The pivot pins 38, 238 extend through the mounting bracket 30, 230 by means of the apertures 37, 237. The pivot pin extends through the levers 36, 236 by means of the apertures 39, 239. The pivot pins 38, 238 are further secured to the levers 36, 236 by means of washers 80, 280. Other securing means such as bolts or other configured washers may be used to secure the pivot pins 38, 238.

The pedal arm 12 is further supported by a pair of bushings 35, 235. The bushings 35, 235 are further supported by the connector 33 operable to support both portions 35, 235. The pair of bushings 35, 235 extend from both sides of the pedal arm to the release levers 36, 236.

The bracket 30 further includes the arm 24 extending rearwardly to the passenger compartment. An actuator, specifically a linear actuator 50, is provided connected to an upper portion 36a of the lever 36. The actuator 50 includes a spring or other forcible assembly 52 and a rod or other connection member 54. The actuator 50 is actuated by an explosive charge. The actuator 50 is activated by a single signal from a crash sensor. The actuator 50 provides sufficient force through the connector 54 to the connection bracket 56 to break the shear pins 40, 240. The actuator 50 exerts a force on the connector 54 on the elongated member 58 connected to the upper portion 36a of the lever 36. As the actuator 50 exerts a force 120 on the elongated member 58 through the bracket 59, the lever 36, 236 is pivoted about the pivot point 38, having an aperture 39, to lift the lever 36. The lever 36 is pivoted about the pivot point 38 to lift the second portion 36b of the lever 36 to release the pedal 12 at the pivot pin 34. The shear pins 40, 240 are sized to hold the open ended slots or cutouts 80, 280 in position during normal operation of the pedal assembly.

Figure 3:
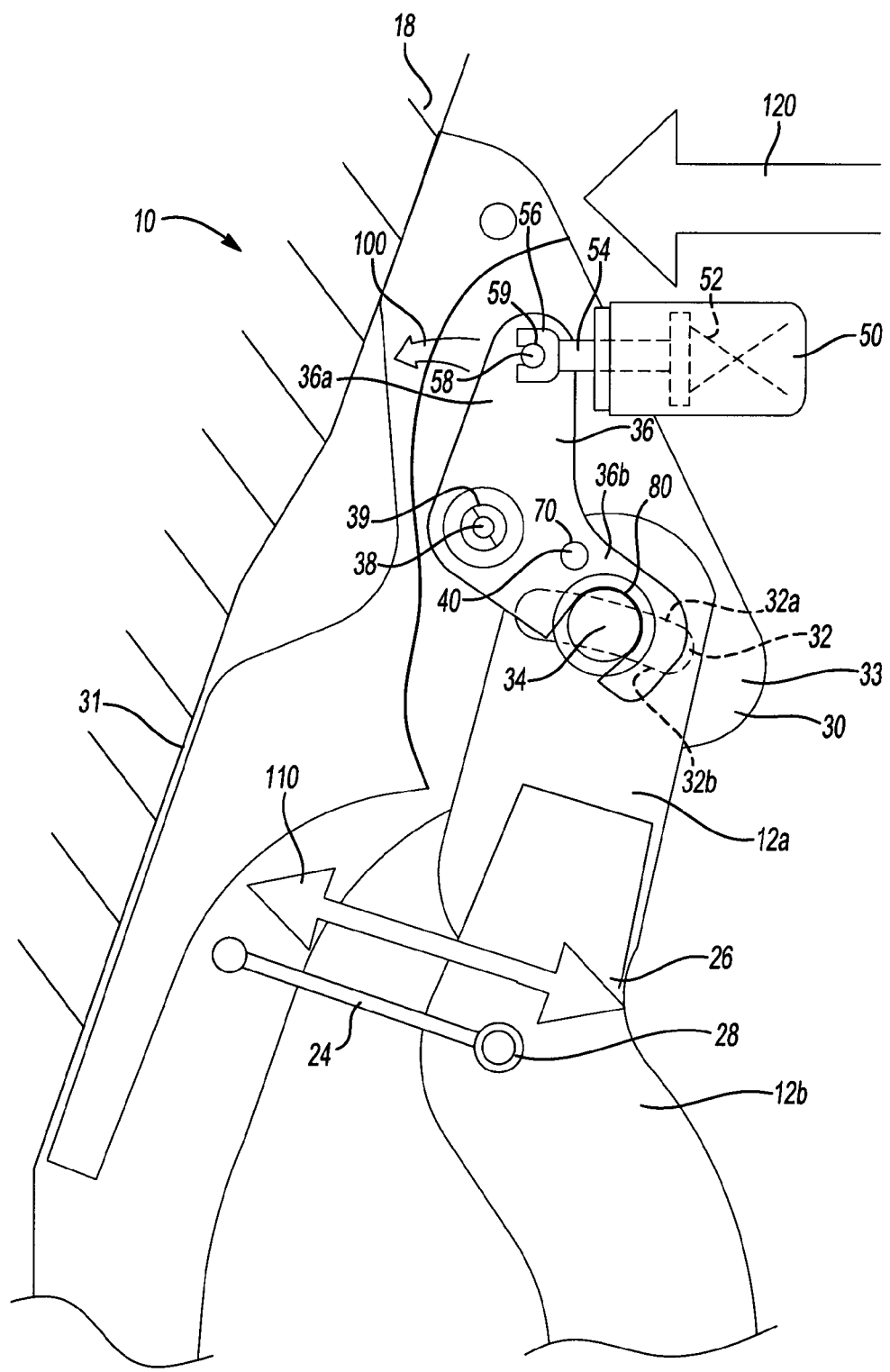
FIG. 3 is a side view of the pedal assembly having active release as force is exerted on the pedal assembly during a crash but before release.
Figure 4:
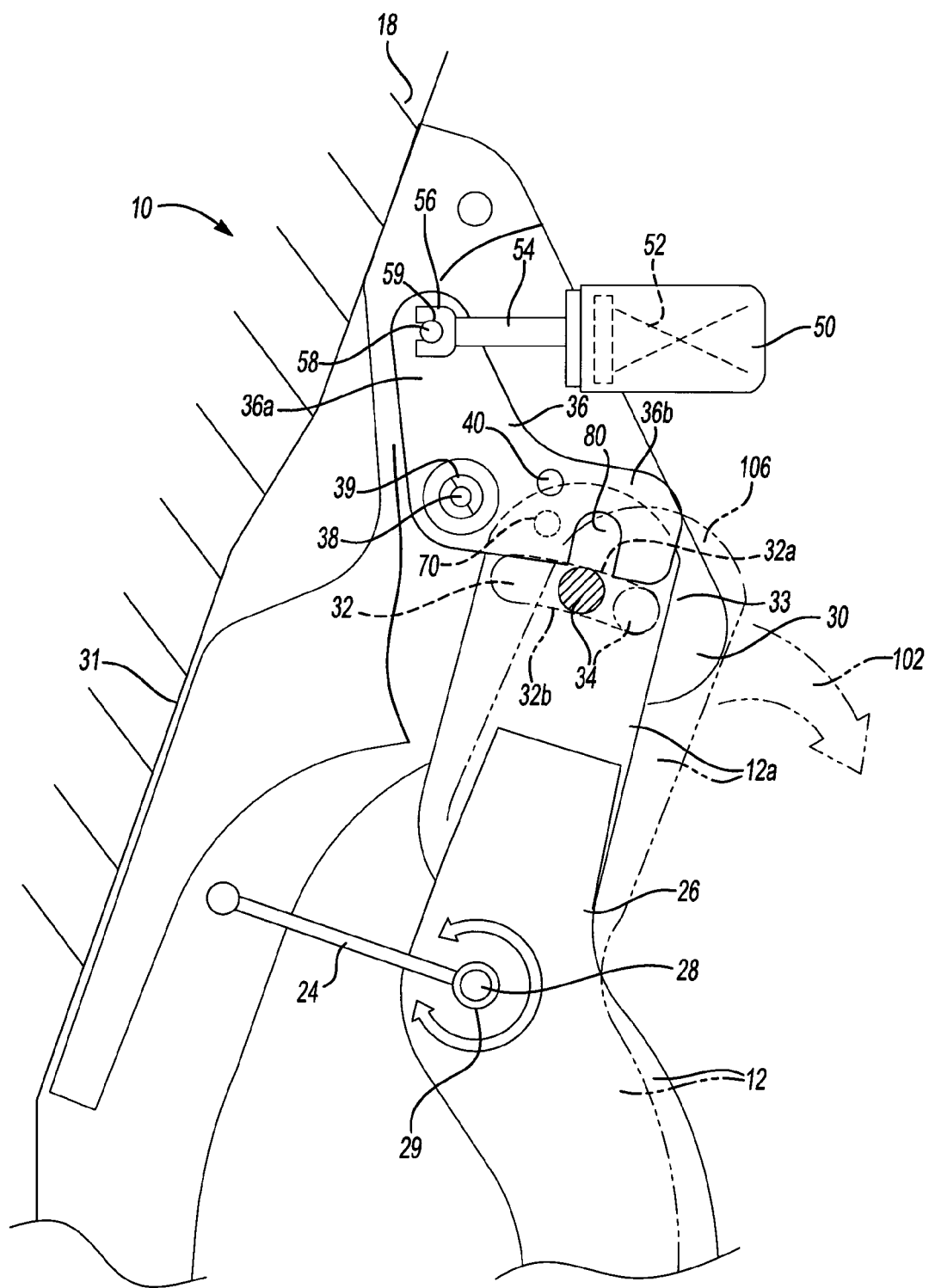
FIG. 4 is a side view of the pedal assembly after force is applied to the actuator during a crash so as to pivot the lever to release the pedal.

As shown in FIGS. 3 and 4, when the release levers 36, 236 are rotated about the pivot point 38 to lift the cutouts 80, 280 of the levers 36, 236 away from the pivot pin 34, the pedal arm 12 having the pivot pin 34 is free to slide down in the slots 32, 232. As the pivot pin 34 slides in the slots 32, 232, it rotates the pedal arm 12 about the pedal rod connection point in such a way that the pedal pad is rotated forwardly away from the passengers. This movement is illustrated by movement arrows 100, 102, 106.

Since the top of the pedal arm 12a and the pivot pin 34 are still held in the slots 32, 232, the pedal 12 can be used to activate the brakes or the clutch. The assembly 10 remains intact and no parts are ejected into the passenger compartment.

The design of the pivot slot 32, 232 allows for maximizing the use of available packaging to tune the amount that the pedal is retracted. In the present embodiment, the pedal arm 12 can move in a range of between 15 and 20 millimeters resulting in travel of the pedal pad in a range of 60 to 80 millimeters. In alternative embodiments, the pedal arm 12 can move any desired length as set by the length of the slot 32, 232 in the bracket 30, 230. The change in length of the slot 32, 232 can be adjusted according to the desired pedal pad 22 travel as requested by a customer.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the appended claims.

The invention claimed is:

1. A pedal assembly for use in an automotive vehicle, the pedal assembly operable to contain the pedal assembly parts during a vehicle crash, the pedal assembly further allowing for pedal movement and operation after a vehicle crash, the pedal assembly comprising:
    a bracket having an elongated slot;
    a pedal arm having a pivot pin, the pivot pin slidably mounted within the elongated slot on the bracket, the pedal arm configured to pivot about the pivot pin;
    a lever having a first portion and a second portion, the first portion directly and releasably connected to the pedal arm, the second portion connected to an actuator, the lever pivotable about a pivot point, the lever pivotally mounted to the bracket; and
    a shear pin mounted through both the lever and the bracket, the shear pin breakable upon a force exerted upon the lever;
    a first position defined when the first portion of the lever is connected to the pivot pin of the pedal arm, the first position further defined when the shear pin is intact; and
    a second position defined when the shear pin breaks and the first portion of the lever pivots away from the pivot pin of the pedal arm after the shear pin is broken, the pivot pin remaining connected to and sliding within the elongated slot of the bracket;
    wherein the pivot pin is free to slide towards an occupant within the elongated slot in the second position thereby allowing the pedal to be operated after a crash.

2. The pedal assembly of claim 1 wherein the pedal arm connects to the bracket by means of the pivot pin.

3. The pedal assembly of claim 1 wherein the first portion of the lever connects to the pedal arm by means of a cutout.

4. The pedal assembly of claim 3 wherein the cutout is generally U-shaped.

5. The pedal assembly of claim 1 wherein the length of the slot on the bracket ranges from 5 to 100 millimeters.

6. The pedal assembly of claim 1 wherein the actuator connects to the second portion of the lever by means of a connection bracket.

7. The pedal assembly of claim 1 wherein the actuator is an explosive charge actuator.

8. The pedal assembly of claim 1 wherein the actuator is connected to the lever by means of a connection rod.

9. The pedal assembly of claim 1 wherein the pedal assembly includes two of said brackets.

10. The pedal assembly of claim 9 wherein the pedal assembly includes two of said levers connected to the two of said brackets, a first lever and a second lever.

11. The pedal assembly of claim 10 wherein the pedal assembly further includes a connection member adapted to connect the first portion of the first lever and the first portion of the second lever.

12. The pedal assembly of claim 11 wherein the pedal assembly includes two of said shear pins connecting the levers to the bracket thereby preventing pivoting movement of each of the levers.

13. The pedal assembly of claim 12 wherein the pedal assembly includes two total pivot pins connecting each lever to each bracket.

14. The pedal assembly of claim 1 wherein the pedal assembly further includes at least one bushing adapted to accept a cutout on the lever to prevent pivotable movement of the lever about the pivot point.

15. The pedal assembly of claim 1 wherein the pedal assembly further includes a pushrod disposed between the pedal arm and the bracket.

16. The pedal assembly of claim 1 wherein the elongated slot is enclosed.

17. The pedal assembly of claim 1 wherein the lever includes a first arm and a second arm, the first arm and the second arm connected at the pivot point.

18. The pedal assembly of claim 17 wherein the first arm is connected to the actuator.

19. The pedal assembly of claim 17 wherein the second arm is connected to the pivot pin.

* * * * *